US006979183B2

(12) United States Patent  (10) Patent No.: US 6,979,183 B2
Baumann  (45) Date of Patent: Dec. 27, 2005

(54) ARRANGEMENT FOR AN EXHAUST GAS TURBO CHARGER WITH A CARRIER HOUSING

(75) Inventor: Hermann Baumann, Tettnang (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 10/801,858

(22) Filed: Mar. 17, 2004

(65) Prior Publication Data

US 2004/0184934 A1  Sep. 23, 2004

(30) Foreign Application Priority Data

Mar. 19, 2003  (DE) .................................. 103 11 996

(51) Int. Cl.⁷ .......................... F04B 17/00; F01D 25/16; F01D 9/00; F02C 7/20
(52) U.S. Cl. ........................................ 417/407; 417/406
(58) Field of Search ................................ 417/407, 406; 415/204; F01D 25/16, 9/00; F02C 7/20

(56) References Cited

U.S. PATENT DOCUMENTS

| | | | | |
|---|---|---|---|---|
| 3,565,497 A | * | 2/1971 | Miller | 417/407 |
| 4,480,440 A | * | 11/1984 | Harper et al. | 417/407 |
| 4,716,735 A | * | 1/1988 | Ruf et al. | 60/605.3 |
| 4,738,548 A | * | 4/1988 | Zloch et al. | 417/407 |
| 5,528,902 A | * | 6/1996 | Hoerl et al. | 417/407 |
| 2003/0007705 A1 | * | 1/2003 | Bosen et al. | 384/99 |

FOREIGN PATENT DOCUMENTS

| | | | | |
|---|---|---|---|---|
| DE | 3226890 A1 | * | 1/1984 | F02C 7/20 |
| DE | 3439738 C2 | | 4/1986 | |
| DE | 10336978 B3 | * | 1/2005 | F01D 9/00 |
| JP | 62284922 A | * | 12/1987 | 417/407 |
| WO | WO 86/06790 A1 | * | 11/1986 | F02B 37/00 |

* cited by examiner

Primary Examiner—Thai-Ba Trieu
(74) Attorney, Agent, or Firm—Crowell & Moring LLP

(57) ABSTRACT

An arrangement is proposed for an exhaust gas turbo charger with a carrier housing. The exhaust gas turbo charger is attached to a bearing housing with the carrier housing by way of a fastening element such that the fastening element is oriented in a direction perpendicular to a shaft arranged within the bearing housing.

14 Claims, 2 Drawing Sheets ed. Of ARRANGEMENT FOR AN EXHAUST GAS TURBO CHARGER WITH A CARRIER HOUSING

This application claims the priority of German application 103 11 996.5, filed Mar. 19, 2003, the disclosure of which is expressly incorporated by reference herein.

BACKGROUND AND SUMMARY OF THE INVENTION

This invention concerns an arrangement for an exhaust gas turbo charger with a carrier housing in which the exhaust gas turbo charger includes a compressor wheel, a turbine wheel, a bearing housing, and a shaft adapted to connect the compressor wheel and the turbine wheel.

An arrangement for an exhaust gas turbo charger with a carrier housing is known from German publication DE 34 39 738 C2. In a manner known from prior art, an exhaust gas turbo charger comprises a compressor housing with a compressor wheel, a turbine housing with a turbine wheel and a bearing housing with a shaft for connection of the compressor wheel to the turbine wheel. The exhaust gas turbo charger and the carrier housing are screwed together. The screws are arranged in an axial direction, that is, parallel to the axis of rotation of the shaft, along the diameter of an annulus outside the carrier housing. The axial ring surface of the cooled carrier housing holds the screw connection and sealing. The contact surface is large, because the axial screw connection lies outside the bearing block. The heat from the not-yet-released exhaust gas is quickly conducted into the cooled carrier housing. Another problem with this arrangement involves the poor accessibility of the screw heads during assembly.

Accordingly, an object of the invention is to provide an arrangement that will enable a more user-friendly assembly.

This object is achieved by having the exhaust gas turbo charger attached to the bearing housing with the carrier housing by way of a fastening element which is oriented in a direction perpendicular to an axis of rotation of the shaft. Other features are set forth in dependent claims. A process of assembling an exhaust gas turbo charger is also claimed.

The fastening element may include screws with the heads of the screws lying inside the diameter of the bearing housing.

Thanks to better accessibility of the screw connection, the bearing housing can be assembled within a short time. The distance between the compressor housing and the turbine housing is shorter than that known from prior art; in other words, the total space required for construction of the exhaust gas turbo charger is reduced. An additional effect involves the fact that the bearing housing can be in a form which involves a simple construction.

By means of an ancillary centering device, the assembly time of the arrangement is shortened. The ancillary centering device is in the form of a snap-on contact. This, first of all, permits the exhaust gas turbo charger and the carrier housing to be oriented, relative to each other, in the direction of the shaft, and, secondly, permits the lubricant to be conducted out of the bearing housing into the carrier housing.

In contrast to what is known from the prior art, there is no longer any need for the contact surface produced by the axial screw connection and sealing to the carrier housing. This has the effect of taking away less heat from the exhaust gas; in other words, the enthalpy of the exhaust gas is improved.

A preferred design is shown in the drawings.

DETAILED DESCRIPTION OF THE INVENTION

Figure 1:
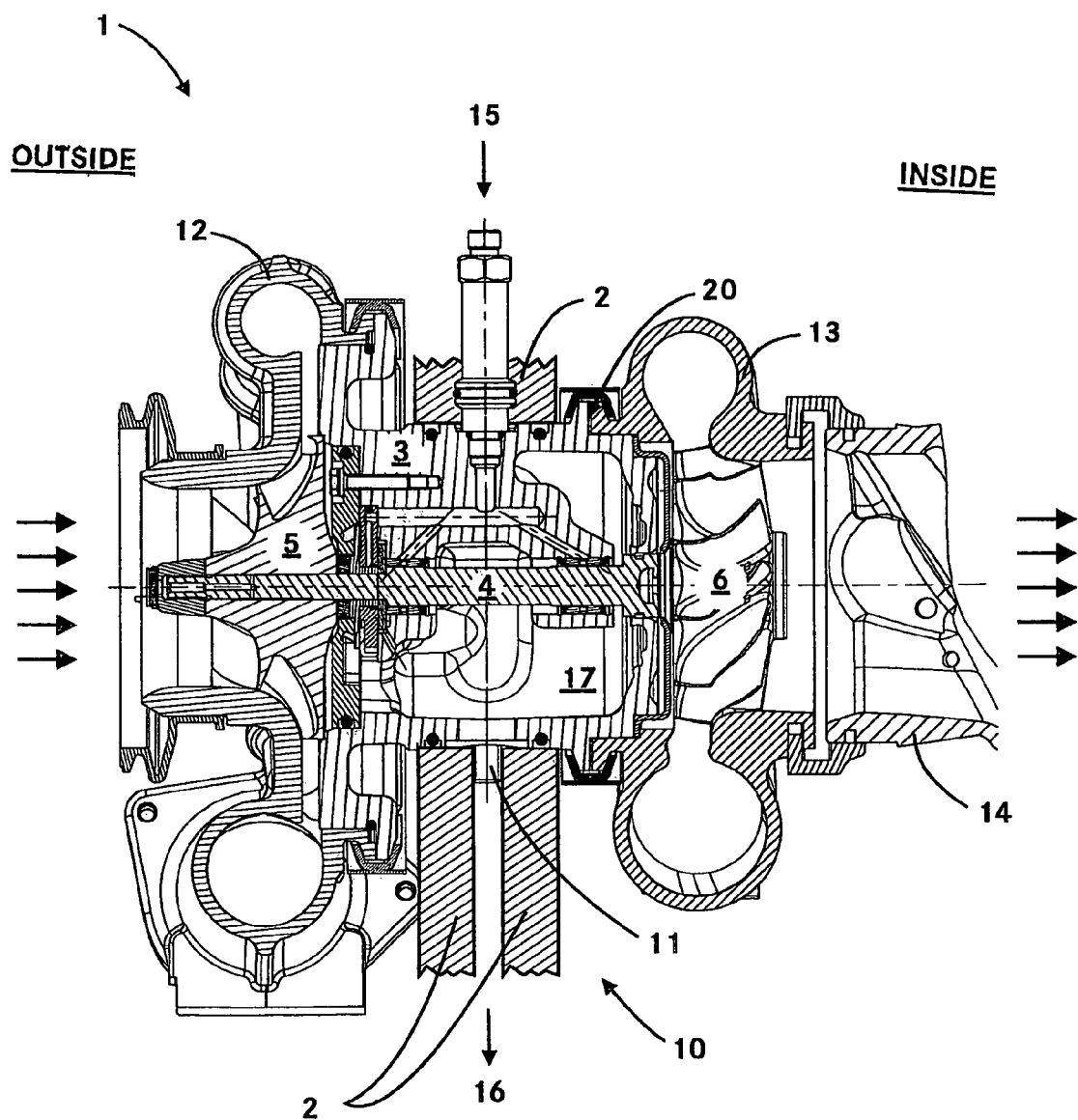
FIG. 1 is a cutaway view of the exhaust gas turbo charger and carrier housing.

FIG. 1 represents a cutaway view of the arrangement of an exhaust gas turbo charger 1 with a carrier housing 2. The function of an exhaust gas turbo charger 1, in the text which follows, is presumed to be known. In a manner known from prior art, an exhaust gas turbo charger comprises a compressor housing 12 with a compressor wheel 5, a turbine housing 13 with a turbine wheel 6 and a bearing housing 3. Arranged within the bearing housing 3 is a shaft 4. By means of the shaft 4, the compressor wheel 5 and the turbine wheel 6 are connected to each other in a torque-proof manner. The turbine housing 13 with an exhaust gas line 14 is located within the carrier housing 2. The compressor housing 12 is located outside the carrier housing 2. As shown in FIG. 1, the air inlet takes place in the direction shown in the drawing, from the left, and the exhaust gas outlet takes place in the direction shown in the drawing, toward the right. By means of a supply inlet 15, lubricant is supplied to the bearing locations of the shaft 4. The lubricant is conducted out of a collection space 17, by means of an outlet 16, into the carrier housing 2.

At the time of assembly of the exhaust gas turbo charger 1, the turbo charger is placed in the carrier housing 2 on the bearing housing 3. By means of an ancillary centering device 10, the exhaust gas turbo charger 1 is oriented in an axial direction—that is, in the direction of the axis of rotation of the shaft 4—and in a circumferential direction. Represented as the ancillary centering device 10 in FIG. 1 is a snap-on contact 11. The snap-on contact 11 simultaneously fulfills the function of conducting the lubricant out of the bearing housing 3 and/or the collection space 17.

Thanks to the axial screw connection, an axial ring flange as required in the prior art is no longer necessary. Accordingly, the heat loss from the exhaust gas into the carrier housing is lessened. As an additional measure, an insulation seam 20 is provided between the turbine housing 13 and the bearing housing 3.

Figure 2:
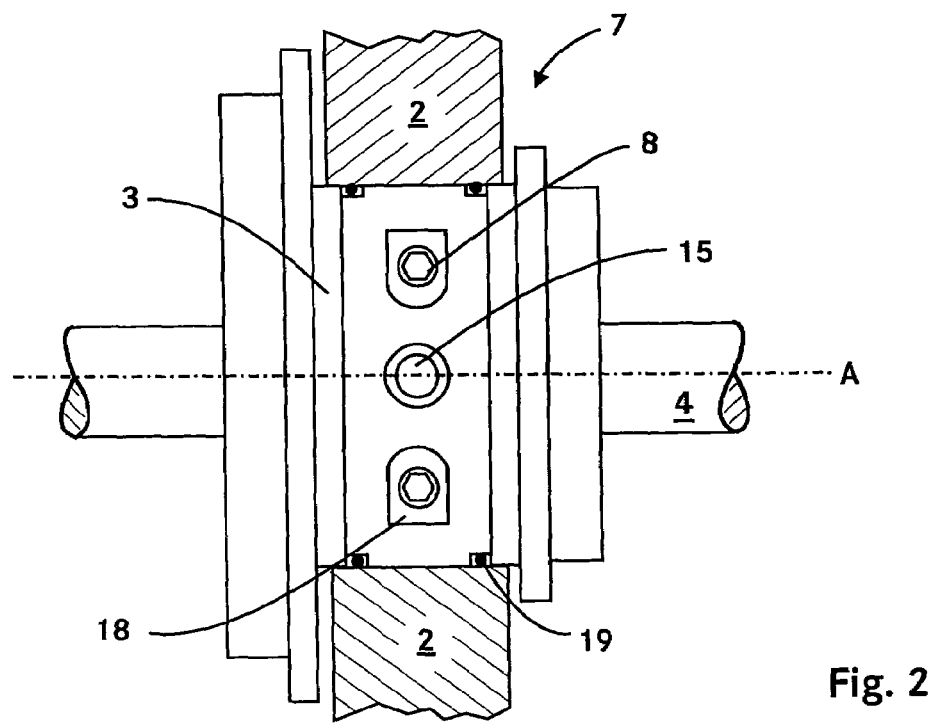
FIG. 2 is a top view.
Figure 3:
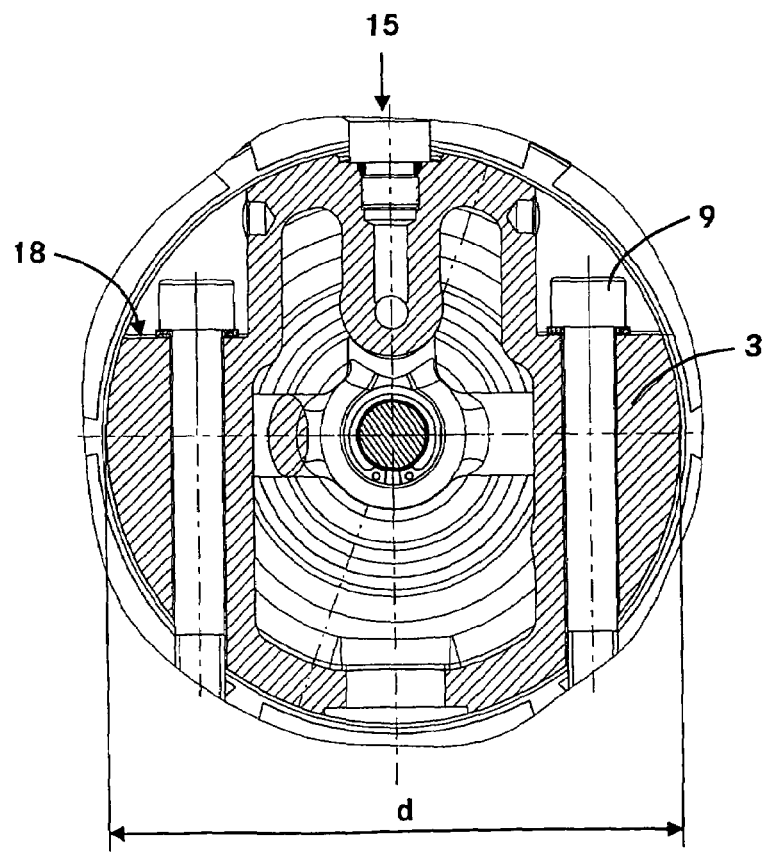
FIG. 3 is a cross-section through the bearing housing.

FIGS. 2 and 3 are jointly described below. FIG. 2 represents the arrangement of the exhaust gas turbo charger 1 with the carrier housing 2 in the area of the bearing housing 3, in a top view. The exhaust gas turbo charger 1 is attached to the carrier housing 2 by means of a fastening element 7. Represented are two screws 8. The screws 8 are oriented in a direction perpendicular to the axis of rotation (reference mark A) of the shaft 4. Their screw heads 9 lie within the diameter d of the bearing housing 3 (see FIG. 3). The bearing housing 3, for this purpose, exhibits a corresponding surface 18 in the area of the screw heads. The carrier housing 2 is sealed off from the surrounding environment by means of a seal 19. Customarily, an O-ring is used, which lies within a groove of the bearing housing 3 and seals off the carrier housing 2. Naturally, suitable liquid seals can also be used as the seal 19.

Advantages of the invention are as follows.

The screw connection between the exhaust gas turbo charger and the carrier housing, which is oriented in a direction perpendicular to the axis of the shaft, has the effect of creating a shorter bearing housing, whereby the total space required for construction of the exhaust gas turbo charger is reduced.

The direct contact surface is minimized and lies on a smaller diameter, whereby the heat entry is reduced.

The reduced heat loss from the exhaust gas has the effect of improving the enthalpy of the exhaust gas.

The bearing housing has a simpler construction than bearing housings known from prior art.

The ancillary centering device guarantees simple assembly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process of assembling an exhaust gas turbo charger with a carrier housing, the exhaust gas turbo charger including a bearing housing with a shaft adapted to extend through the bearing housing and connect a compressor wheel in a compressor housing and a turbine wheel in a turbine housing, comprising:
    placing the bearing housing in the carrier housing, and
    attaching the exhaust gas turbo charger to the carrier housing by way of fastening elements, which are oriented in directions perpendicular to an axis of rotation of the shaft such that the turbine housing is located within the carrier housing and the compressor housing is located outside the carrier housing,
    wherein the fastening element is in the form of screws, and wherein screw heads of the screws are arranged within a diameter of the bearing housing.

2. A process of assembling an exhaust gas turbo charger with a carrier housing, the exhaust gas turbo charger including a bearing housing with a shaft adapted to connect a compressor wheel and a turbine wheel, comprising:
    placing the bearing housing in the carrier housing, and
    attaching the exhaust gas turbo charger to the carrier housing by way of a fastening element, which is oriented in a direction perpendicular to an axis of rotation of the shaft,
    wherein an ancillary centering device for orientation of the exhaust gas turbo charger on the carrier housing is provided on the bearing housing.

3. The process of assembling an exhaust gas turbo charger with a carrier housing according to claim 2, wherein the ancillary centering device is in the form of a snap-on contact.

4. The process of assembling an exhaust gas turbo charger with a carrier housing according to claim 3, wherein, by way of the snap-on contact, lubricant is conducted out of the bearing housing and into the carrier housing.

5. A process of assembling an exhaust gas turbo charger with a carrier housing, the exhaust gas turbo charger including a bearing housing with a shaft adapted to connect a compressor wheel and a turbine wheel, comprising:
    placing the bearing housing in the carrier housing, and
    attaching the exhaust gas turbo charger to the carrier housing by way of fastening elements, which are oriented in directions perpendicular to an axis of rotation of the shaft,
    wherein the fastening elements are in the form of screws,
    wherein screw heads of the screws are arranged within a diameter of the bearing housing, and
    wherein an ancillary centering device for orientation of the exhaust gas turbo charger on the carrier housing is provided on the bearing housing.

6. The process of assembling an exhaust gas turbo charger with a carrier housing according to claim 5, wherein the ancillary centering device is in the form of a snap-on contact.

7. The process of assembling an exhaust gas turbo charger with a carrier housing according to claim 6, wherein, by way of the snap-on contact, lubricant is conducted out of the bearing housing and into the carrier housing.

8. An arrangement for an exhaust gas turbo charger with a carrier housing, the exhaust gas turbo charger comprising:
    a compressor wheel,
    a turbine wheel,
    a bearing housing, and
    a shaft adapted to connect the compressor wheel and the turbine wheel,
    wherein the bearing housing is mounted in and attached to the carrier housing by way of a fastening element, which is oriented in a direction perpendicular to an axis of rotation of the shaft, and
    wherein an ancillary centering device for orientation of the exhaust gas turbo charger on the carrier housing is provided on the bearing housing.

9. The arrangement for an exhaust gas turbo charger with a carrier housing according to claim 8, wherein the ancillary centering device is in the form of a snap-on contact.

10. The arrangement for an exhaust gas turbo charger with a carrier housing according to claim 9, wherein, by way of the snap-on contact, lubricant is conducted out of the bearing housing and into the carrier housing.

11. An arrangement for an exhaust gas turbo charger with a carrier housing, the exhaust gas turbo charger comprising:
    a compressor wheel,
    a turbine wheel,
    a bearing housing, and
    a shaft adapted to connect the compressor wheel and the turbine wheel,
    wherein the bearing housing is mounted in and attached to the carrier housing by way of fastening elements, which are oriented in directions perpendicular to an axis of rotation of the shaft,
    wherein the fastening elements are in the form of screws,
    wherein screw heads of the screws are arranged within a diameter of the bearing housing, and
    wherein an ancillary centering device for orientation of the exhaust gas turbo charger on the carrier housing is provided on the bearing housing.

12. The arrangement for an exhaust gas turbo charger with a carrier housing according to claim 11, wherein the ancillary centering device is in the form of a snap-on contact.

13. The arrangement for an exhaust gas turbo charger with a carrier housing according to claim 12, wherein, by way of the snap-on contact, lubricant is conducted out of the bearing housing and into the carrier housing.

14. An arrangement for an exhaust gas turbo charger with a carrier housing, the exhaust gas turbo charger comprising:
    a compressor wheel in a compressor housing,
    a turbine wheel in a turbine housing,
    a bearing housing, and
    a shaft adapted to extend through the bearing housing and connect the compressor wheel and the turbine wheel,
    wherein the turbine housing is located within the carrier housing and the compressor housing is located outside the carrier housing, and
    wherein the bearing housing is mounted in and attached to the carrier housing by way of fastening elements, which are oriented in directions perpendicular to an axis of rotation of the shaft, and
    wherein the fastening elements are in the form of screws, and wherein screw heads of the screws are arranged within a diameter of the bearing housing.

* * * * *